US012731598B2

(12) United States Patent
Kurtz

(10) Patent No.: US 12,731,598 B2
(45) Date of Patent: Sep. 8, 2026

(54) SPEECH RECOGNITION OF AUDIO

(71) Applicant: Comcast Cable Communications, LLC, Philadelphia, PA (US)

(72) Inventor: Scott Kurtz, Mount Laurel, NJ (US)

(73) Assignee: Comcast Cable Communications. LLC, Philadelphia, PA (US)

( * ) Notice: Subject to any disclaimer, the term of this patent is extended or adjusted under 35 U.S.C. 154(b) by 558 days.

(21) Appl. No.: 18/147,930

(22) Filed: Dec. 29, 2022

(65) Prior Publication Data

US 2024/0221768 A1 Jul. 4, 2024

(51) Int. Cl.
*G10L 21/02* (2013.01)
*G10L 15/22* (2006.01)
*G10L 21/0208* (2013.01)

(52) U.S. Cl.
CPC .......... *G10L 21/0208* (2013.01); *G10L 15/22* (2013.01); *G10L 2015/223* (2013.01); *G10L 2021/02082* (2013.01)

(58) Field of Classification Search
CPC ................ G10L 21/0208; G10L 15/22; G10L 2015/223; G10L 2021/02082; G10L 2021/02166
See application file for complete search history.

(56) References Cited

U.S. PATENT DOCUMENTS

2011/0002473 A1* 1/2011 Nakatani ................. H04S 7/305 381/66
2016/0203828 A1* 7/2016 Gomez ................... G10L 15/20 704/226
2017/0287499 A1* 10/2017 Duong ................ G10L 21/0208
2018/0286423 A1* 10/2018 Nakadai ................ G10L 21/028
2021/0304735 A1* 9/2021 Gao ....................... H04R 3/005
2022/0248135 A1* 8/2022 Chen ....................... H04S 3/004
2023/0223041 A1* 7/2023 Mosayyebpour ... G10L 21/0208 704/233
2023/0223042 A1* 7/2023 Mosayyebpour ... G10L 21/0216 704/233
2024/0031765 A1* 1/2024 Munoz .................... H04S 7/303
2024/0221770 A1* 7/2024 Fukui ..................... G10K 15/12
2024/0357309 A1* 10/2024 Gollakota ............. G10L 21/028

* cited by examiner

*Primary Examiner* — Mark Villena
(74) *Attorney, Agent, or Firm* — BakerHostetler

(57) ABSTRACT

Methods and systems for audio intelligibility enhancement are disclosed. A portion of audio data associated with a source may be determined based on a source separation process. Reverberation data associated with the source may be determined based on the portion of the audio data associated with the source. An updated portion of the audio data associated with the source may be generated based on the reverberation data associated with the source and the source separation process. An audio signal associated with the source may be generated based on the updated portion of the audio data associated with the source.

19 Claims, 8 Drawing Sheets

500

SPEECH RECOGNITION OF AUDIO

BACKGROUND

Voice recognition systems and devices that receive and respond to voice queries are becoming increasingly common. A voice query may be, for example, a spoken command to the device to perform some action, a spoken request to view or play some particular content, a spoken request to search for certain content or information based on search criteria, or any other spoken request or command that may be spoken by a user. However, the accuracy of speech recognition can be degraded by a number of factors, such as noise, reverberation, and/or extraneous audio generated by other sources. Therefore, improvements in audio processing techniques are desirable.

SUMMARY

Methods and systems for enhancement of audio intelligibility are disclosed. One or more audio inputs (e.g., microphones) may capture audio data, such as from one or more sources. The speech recognition of the audio data may be improved. To improve the speech recognition of the audio data, the audio data may be separated based on source and de-reverberated. There may be no basis for de-reverberating the audio data if the audio data has not yet been separated based on source. A location estimate may be utilized to separate the audio data according to the one or more sources. The source-separated audio data may be de-reverberated. The de-reverberated audio data may be used to update the location estimate of the one or more sources. With an improved location estimate, the separated portions of the audio may be updated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Figure 1:
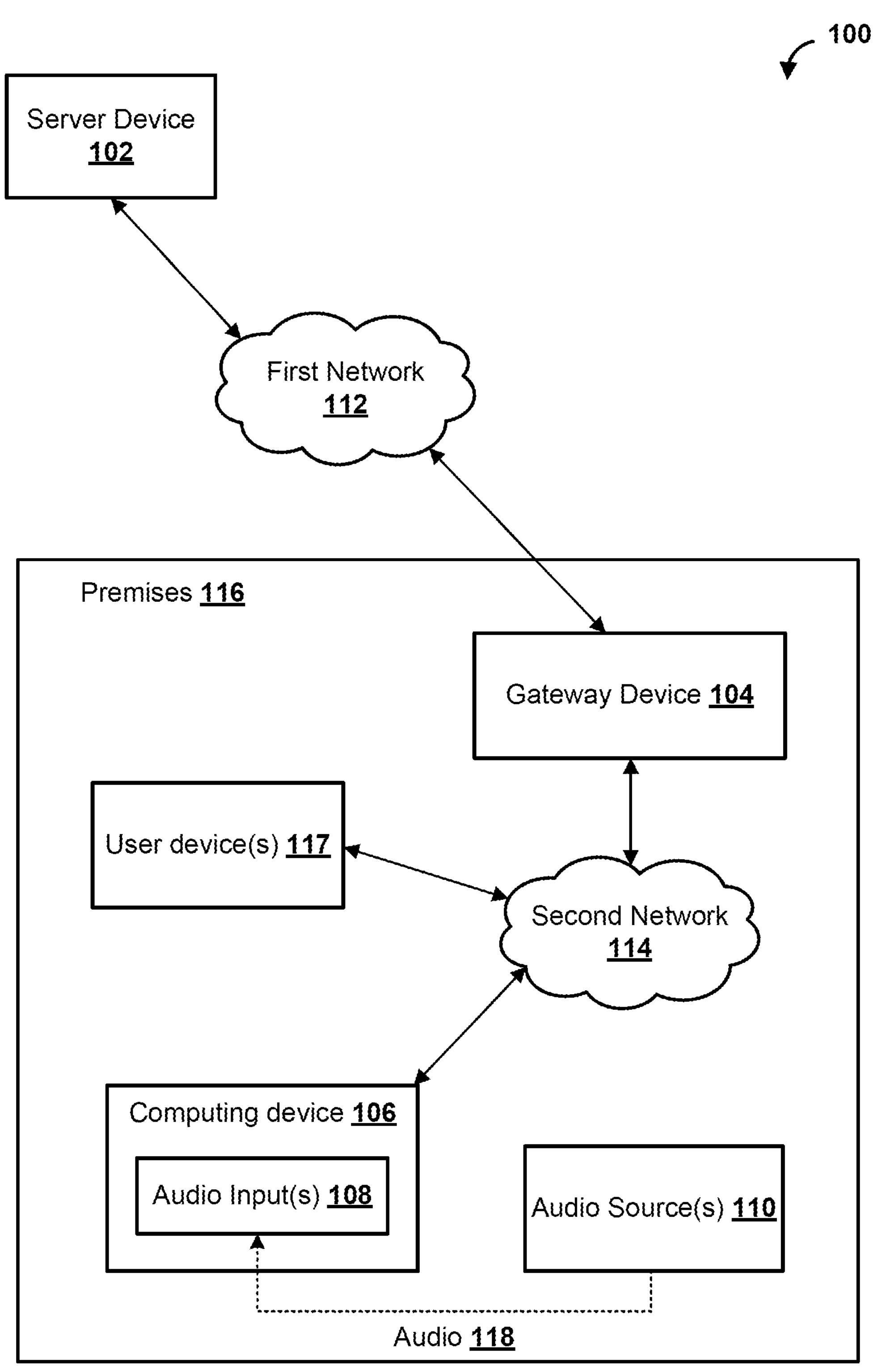
FIG. 1 shows a block diagram of an example system.

Methods and systems for audio intelligibility enhancement are disclosed. An example voice recognition device may comprise one or more audio inputs (e.g., microphones, microphone arrays, etc.) The audio input(s) may capture audio. The captured audio may be processed to improve the speech recognition of the audio data. Processing the audio data to improve the speech recognition of the audio data may comprise performing a de-reverberation process on the audio data (e.g., de-reverberating the audio data). Processing the audio data to improve the speech recognition of the audio data may comprise performing a blind source separation process on the audio data (e.g., performing blind source separation on the audio data). The processed audio data may be further analyzed to determine a voice command or query indicated by the audio data. One or more actions may be caused to be performed based on the determined voice command or the voice query. Additionally, or alternatively, the processed audio may be utilized for full-duplex voice communication (e.g., by a speakerphone, by a conference or video call platform, etc.)

The de-reverberation process may comprise removing reverberation from the audio data. Reverberation is the persistence of sound, or echo after a sound is produced. Reverberation is created when a sound or signal is reflected, such as when a sound or signal is reflected against the walls, ceiling, or floors in a room. Reverberation may be detrimental to the intelligibility of the audio data. The blind source separation process may separate the audio data into different streams based on source. If the audio data is a composite of two different audio signals emanating from two different sources, the blind source separation process may separate (e.g., divide) the audio data into two different streams: one stream corresponding to the first source, and another stream corresponding to the second source.

However, it may be difficult or impossible to perform the de-reverberation process if the audio data has not yet been separated based on source. It may be impossible to perform the de-reverberation process if the audio data has not yet been separated based on source because each source is associated with its own unique reverberation characteristics (e.g., each source is associated with a particular reverberation model). Audio data may comprise first speech emanating from a first person in a corner of a room and second speech emanating from a second person (e.g., or other source, device, television, radio) in the middle of the room. The reverberation characteristics associated with the first person are different than the reverberation characteristics associated with the second person due to their different locations in the room. Thus, it may not be possible to perform (e.g., or accurately perform) the de-reverberation process on audio data that is a composite of two different audio signals emanating from two different sources.

It may be difficult or impossible to perform the blind source separation process if the effects of reverberation have not yet been removed from the audio data. To separate the audio data into different streams based on source, the blind source separation process may utilize the location of the sources. However, the location of the sources may not be able to be determined if there is reverberation present in the audio data. Thus, a circular problem exists when trying to improve the speech recognition of the audio data. If the intelligibility of the audio data cannot be enhanced, it may be difficult to determine a voice command or query indicated by the audio data. If intelligibility of the audio data cannot be enhanced, the quality of a full-duplex voice communication based on the audio data may be poor. One or more participants of the full-duplex voice communication may be unable to understand what the other participant(s) are saying. Improved techniques for enhancing the intelligibility of audio data are therefore needed.

Described herein are improved techniques for enhancing the intelligibility of audio data. An iterative process may be used to improve the speech recognition of audio captured by one or more audio inputs. The iterative process may comprise de-reverberating (e.g., removing reverberation from) the audio data and performing blind source separation (e.g., separating the audio data according to the one or more sources). During the first iteration, there may be no basis for de-reverberating the audio data as the audio data has not yet been separated based on source. A location estimate of each of the one or more sources may be determined based on the captured audio. The location estimate of each of the one or more sources may be determined based on estimating a direction (e.g., angle of arrival) associated with the audio data arriving at the one or more audio inputs from each of the one or more sources. The location estimate may be utilized to separate the audio data according to the one or more sources. During the second iteration, the separated audio data may be de-reverberated. An updated (e.g., improved) location estimate of each of the one or more sources may be determined based on the de-reverberated audio data. The improved location estimate may be utilized to update (e.g., improve) the separation of the audio data according to the one or more sources. Any quantity of additional iterations may be performed. The source location estimates and/or de-reverberation may incrementally improve along with each additional iteration.

FIG. 1 shows a block diagram of an example system 100. The system 100 may comprise a server device 102, a gateway device 104, a computing device 106, one or more user devices 117, or any combination thereof. It should be noted that while the singular term device is used herein, it is contemplated that some devices may be implemented as a single device or a plurality of devices (e.g., via load balancing). The server device 102, the gateway device 104, the computing device 106, and the one or more user devices 117 may each be implemented as one or more computing devices. Any device disclosed herein may be implemented using one or more computing nodes, such as virtual machines, executed on a single device and/or multiple devices.

The server device 102, the gateway device 104, the computing device 106, and/or one or more user devices 117 may be communicatively coupled via one or more networks, such as a first network 112 (e.g., a wide area network) and one or more second networks 114 (e.g., one or more local area networks). The first network 112 may comprise a content distribution and/or access network. The first network 112 may facilitate communication via one or more communication protocols. The first network 112 may comprise fiber, cable, a combination thereof. The first network 112 may comprise wired links, wireless links, a combination thereof, and/or the like. The first network 112 may comprise routers, switches, nodes, gateways, servers, modems, and/or the like.

The one or more second networks 114 may comprise one or more networks in communication with the gateway device 104, the computing device 106, and/or one or more user devices 117. The one or more second networks 114 may comprise one or more networks at a premises 116. The premises 116 may be a customer premises. The premises 116 may include an area within a coverage range (e.g., wireless range) of the gateway device 104. The premises 116 may comprise a property, dwelling, terminal, building, floor, and/or the like. The premises 116 may comprise different rooms, walls, door, windows, and/or the like. The one or more user devices 117 may move within the premises 116 and/or outside of the premises.

The computing device 106 may be configured to receive audio data. The computing device 106 may comprise one or more audio inputs 108. The audio input(s) 108 may comprise one or more microphone(s) or microphone arrays. One or more of the audio input(s) 108 may be located on the computing device 106. Additionally, or alternatively, one or more of the audio input(s) 108 may be located external to the computing device 106 (i.e., part of another device, a second voice controlled device, a remote control, a user device, a smart speaker, etc.)

The audio input(s) 108 may be configured to capture audio 118 emanating from one or more audio sources 110. The audio source(s) 110 may comprise anything (e.g., device, object, animal, etc.) or anyone (e.g., human) that is capable of outputting audio. The audio source(s) 110 may be located within the premises 116, such as in one or more rooms of the premises 116, and/or outside of the premises 116.

Figure 2:
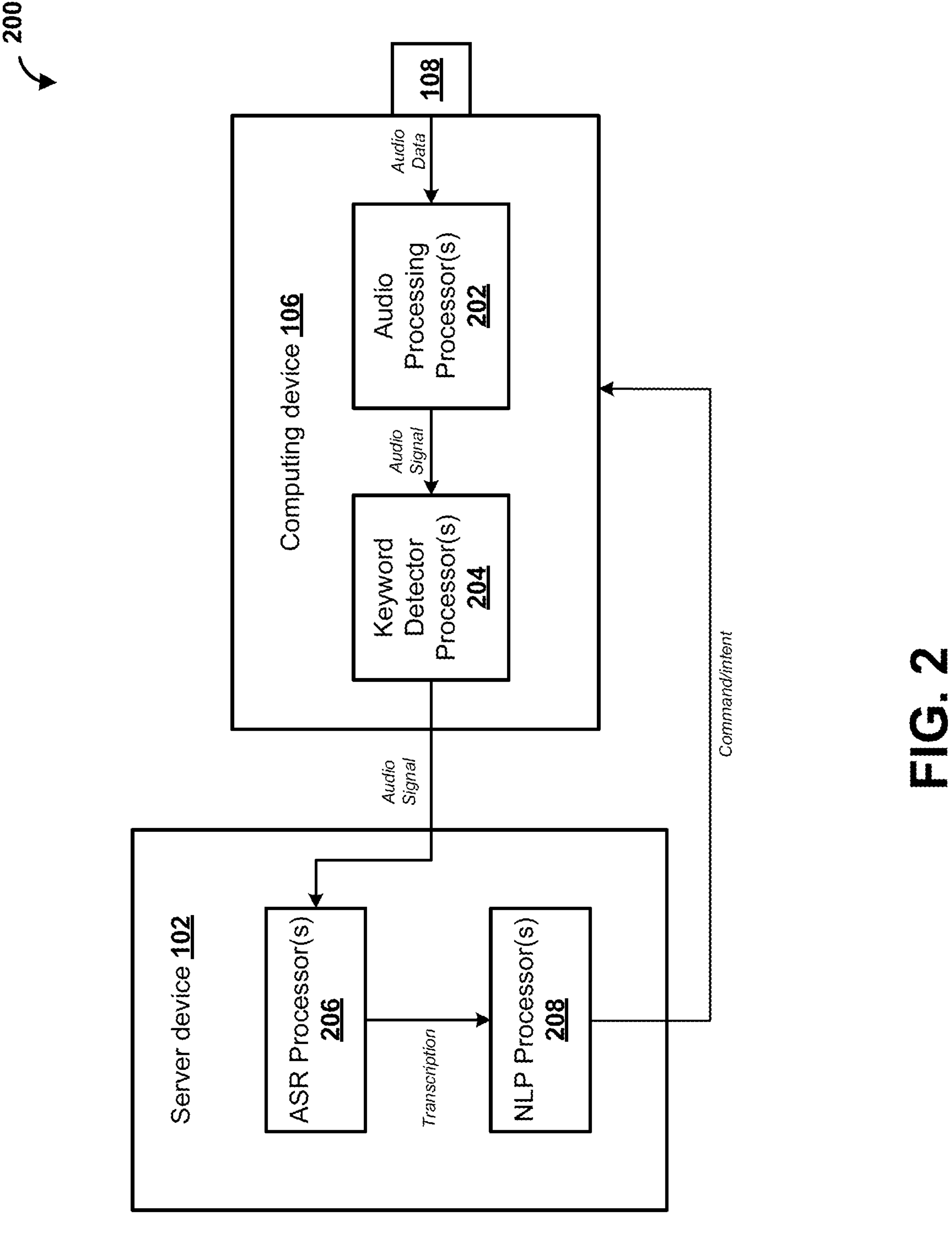
FIG. 2 shows an example voice recognition process.

The computing device 106 may be a voice recognition device or a voice-controlled device. FIG. 2 shows an example voice recognition process. The computing device 106 may receive audio (e.g., audio 118). The audio input(s) 108 of the computing device 106 may capture the audio. The audio may be received from (e.g., emanate from) the audio source(s) 110. The audio input(s) 108 may forward (e.g., send) audio data associated with the captured audio to one or more audio processors 202 of the computing device 106. The audio processor(s) 202 may comprise a hardware processor, a circuit, an application-specific integrated circuit (ASIC, a field programmable gate array (FPGA), a computer readable code for implementing a process, and/or the like.

The audio processor(s) 202 may be configured to implement one or more audio processing algorithms. Implementing the audio processing algorithm(s) may improve the speech recognition of the audio data. Implementing the audio processing algorithm(s) may comprise performing an iterative process to improve the speech recognition of the audio data. The iterative process may comprise de-reverberating (e.g., removing reverberation from) the audio data and performing blind source separation (e.g., separating the audio data according to the one or more sources). Such an iterative process is described in more detail below with regard to FIGS. 3-7.

The output of the audio processing algorithm(s) may be one or more audio signals. The speech recognition of the audio signal(s) may be improved relative to the audio data. The audio signal(s) may be separated based on audio source(s) 110 and/or may comprise less reverberation than the audio data. The audio signal(s) may be forwarded to one or more keyword processors 204 configured to perform keyword detection. The keyword processor(s) 204 may comprise a hardware processor, a circuit, an application-specific integrated circuit (ASIC, a field programmable gate array (FPGA), a computer readable code for implementing a process, and/or the like. The keyword processor(s) 204 may be a component of the computing device 106.

The keyword processor(s) 204 may analyze the audio signal(s) to determine if the audio signal(s) include a keyword (e.g., trigger word, key phrase, wake word). The keyword may be one or more words that indicate that a voice query or command is also included in the audio signal(s). The keyword may be a phrase such as "Hey Device." If the keyword processor(s) 204 detect the keyword in a particular audio signal, the keyword processor(s) 204 may send or stream that audio signal to the server 102. The server 102 may comprise one or more automatic speech recognition (ASR) processors 206 configured to perform ASR and one or more natural language processing (NLP) processors 208 configured to perform NLP. The ASR processor(s) 206 and/or the NLP processor(s) 208 may comprise a hardware processor, a circuit, an application-specific integrated circuit (ASIC, a field programmable gate array (FPGA), a computer readable code for implementing a process, and/or the like.

The audio signal received at the server 102 from the keyword processor(s) 204 may be sent to the ASR processor(s) 206. The ASR processor(s) 206 may perform ASR on the audio signal. The ASR processor(s) 206 may transcribe the audio signal into words. The transcription may be sent from the ASR processor(s) 206 to the NLP processor(s) 208. The NLP processor(s) 208 may utilize the transcription to determine the voice query or command. The NLP processor(s) 208 may send the determined voice query or command to the computing device 106.

The computing device 106 may, in response to receiving the determined voice query or command, cause one or more actions to be performed. The actions may be caused to be performed based on the determined voice query or command. Causing the action(s) to be performed may comprise performing the action(s). Additionally, or alternatively, causing the action(s) to be performed may comprise causing a different device (e.g., one or more of the user devices 117) to perform the action(s). If the determined voice query or command is "tune to channel 4," the computing device 106 may cause a television to be tuned to channel 4.

Referring back to FIG. 1, the computing device 106 may comprise a set-top box, a television, a streaming stick, a smart device (e.g., smart speaker, smart glasses, smart watch, smart television, smart phone), a mobile device, a tablet, a computing station, a laptop, a digital streaming device, a control device, a remote control, a voice-controlled device, virtual assistant device, and/or the like. The computing device 106 may be configured to communicate with the gateway device 104, the server device 102, the one or more user devices 117, and/or the like.

The user device(s) 117 may comprise a computing device, a smart device (e.g., smart glasses, smart watch, smart phone), a mobile device, a tablet, a computing station, a laptop, a digital streaming device, a set-top box, a streaming stick, a television, and/or the like. In some scenarios, a user may have multiple user devices, such as a mobile phone, a smart watch, smart glasses, a combination thereof, and/or the like. The user device(s) 117 may be configured to communicate with the gateway device 104, the server device 102, the computing device 106, and/or the like. The user device(s) 117 may be located within the premises 116, outside of the premises 116, and/or may be configured to move between the premises 116 and outside of the premises 116. The user device(s) 117 may perform any of the audio data processing described herein, such as the iterative process, de-reverberation, source separation, ASR, NLP, and/or the like.

The server device 102 may be configured to provide one or more services, such as a content service, a voice recognition service, a voice control service, a premises service, an automation service, or a combination thereof. The server device 102 may perform any of the audio data processing described herein, such as the iterative process, de-reverberation, source separation, ASR, NLP, and/or the like. The server device 102 may be configured to perform ASR and/or NLP on audio signal(s). The server device 102 may be configured to perform ASR and/or NLP on audio signal(s) to determine a voice query or command associated with the audio signal. The server device 102 may determine the voice query or command based on a transcription of the audio signal. The server device 102 may send the determined voice query or command to the computing device 106.

The gateway device 104 may be configured to facilitate communication between the server device 102 and one or more of the computing device 106 and the user device(s) 117, or a combination thereof. The gateway device 104 may perform any of the audio data processing described herein, such as the iterative process, de-reverberation, source separation, ASR, NLP, and/or the like. The gateway device 104 may be comprise a computing device, an access point (e.g., wireless access point), a router, a modem, device controller (e.g., automation controller, security controller, premises health controller, content device controller) a combination thereof, and/or the like. The gateway device 104 may be configured to communicate using the one or more second networks 114 at the premises 116. The gateway device 104 may be configured to implement one or more services associated with the server device 102 (e.g., or with the premises 116), such as a content service, a voice recognition service, a voice control service, a premises service, an automation service, or a combination thereof.

Figure 3:
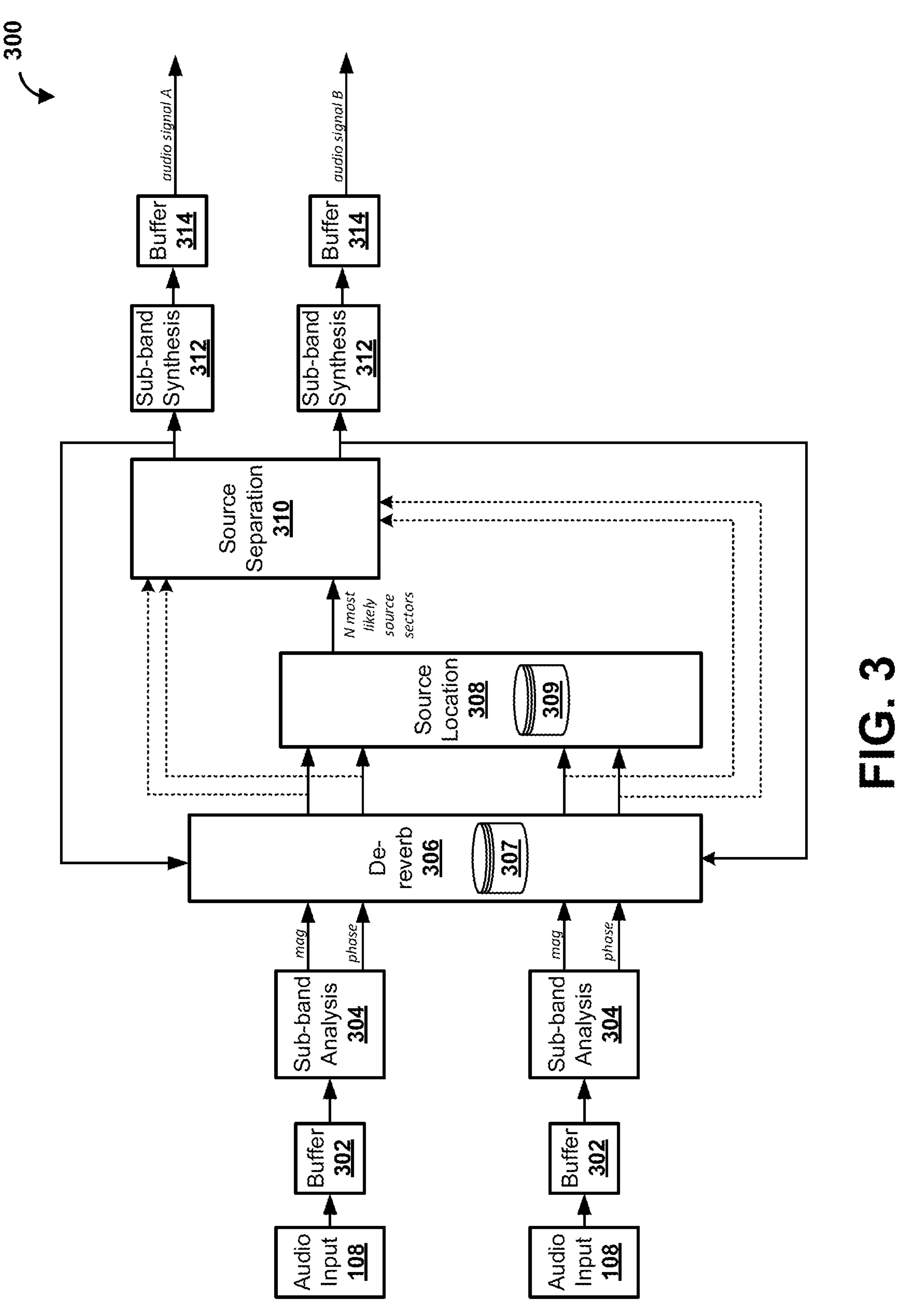
FIG. 3 shows an example audio processing algorithm.

FIG. 3 shows an example audio processing algorithm 300. Implementation of the audio processing algorithm 300 may improve the speech recognition of captured audio. The algorithm 300 may be performed by the computing device 106 (e.g., the processor(s) 202) to improve the speech recognition of the captured audio. Implementing the audio processing algorithm 300 may comprise performing an iterative process to improve the speech recognition of captured audio. The iterative process may comprise de-reverberating (e.g., removing reverberation from) the audio data and performing blind source separation on the audio data (e.g., separating the audio data according to one or more sources).

One or more of the audio input(s) 108 may be configured to capture (e.g., receive) first audio data. As described above, the audio input(s) 108 may each comprise one or more microphones or microphone arrays. The audio input(s) 108 may capture the first audio data emanating from one or more audio sources (e.g., audio sources 110). The audio source(s) may comprise anything (e.g., device, object, animal, etc.) or anyone (e.g., human) that is capable of outputting audio. The first audio data may be forwarded to one or more buffer modules 302. Each of the audio input(s) 108 may be configured to forward first audio data associated with audio captured by that particular audio input 108 to the buffer module(s) 302.

The buffer module(s) 302 may be configured to receive the first audio data. The buffer module(s) 302 may buffer the first audio data to generate one or more buffers of first audio data. The buffer(s) of first audio data may comprise a predetermined amount (e.g., portion, duration) of first audio data. The predetermined amount of first audio data may comprise any amount of time. The predetermined amount of first audio data may comprise less than one second of audio (e.g., ten milliseconds, fifteen milliseconds, thirty milliseconds, thirty-two milliseconds, etc.) of audio data. The buffer(s) of first audio data may be forwarded to one or more sub-band analysis modules 304. The buffer module(s) 302 may be configured to forward the buffer(s) of first audio data to one or more sub-band analysis modules 304.

The sub-band analysis module(s) 304 may be configured to receive the buffer(s) of first audio data. The sub-band analysis module(s) 304 may be configured to convert the buffer(s) of first audio data from the time domain to the frequency domain. To convert the buffer(s) of first audio data from the time domain to the frequency domain, the sub-band analysis module(s) 304 may perform a sub-band analysis on the buffer(s) of first audio data. Performing the sub-band analysis on the buffer(s) of first audio data may comprise decomposing or dividing the buffer(s) of first audio data into a plurality of frequency bins (e.g., real and imaginary, or magnitude and phase).

Each the buffer(s) of first audio data may be input to the sub-band analysis module(s) 304. The output of the sub-band analysis module(s) 304 may comprise a plurality (e.g., 256) of complex frequency samples or amplitudes. Each complex frequency sample or amplitude may represent a complex weight corresponding to a single frequency bin of the plurality of frequency bins. The plurality of frequency bins may, for example, cover a span of 0 to 8 kHz, equally spaced 8000/256 Hz apart. As an alternative to or in addition to performing a sub-band analysis on the buffer(s) of first audio data, an inverse Fourier transform may instead be performed on the buffer(s) of first audio data to convert the buffer(s) of first audio data from the time domain to the frequency domain. The output of the sub-band analysis module(s) 304 may be forwarded to a de-reverberation module 306. The sub-band analysis module(s) 304 may be configured to send the output of the sub-band analysis module(s) 304 to the de-reverberation module 306.

The de-reverberation module 306 may be configured to receive the output of the sub-band analysis module(s) 304. The iterative process to improve the speech recognition of the first audio data may be initiated (e.g., started) based on the de-reverberation module 306 receiving the output of the sub-band analysis module(s) 304. The iterative process may comprise the de-reverberation module 306 de-reverberating the first audio data and a source separation module 310 performing blind source separation on the first audio data. The de-reverberation of the first audio data and the blind source separation may both be performed in the frequency domain (e.g., with respect to frequency, rather than time).

However, as described above, it may be difficult or impossible to de-reverberate the first audio data if the first audio data has not yet been separated based on source because each source is associated with its own unique reverberation characteristics (e.g., each source is associated with a particular reverberation model). Thus, on the first iteration of the iterative process to improve the speech recognition of the first audio data, there may be no basis for de-reverberating the first audio data. Accordingly, on the first iteration of the iterative process, the de-reverberation module 306 may not perform any de-reverberation.

On the first iteration of the iterative process, the de-reverberation module 306 may forward the output of the sub-band analysis module(s) 304 to a source location (e.g., source localization) module 308 instead of attempting to de-reverberate the first audio data. The source location module 308 may receive the output of the sub-band analysis module(s) 304. The source location module 308 may be configured to determine (e.g., estimate) location data associated with each of the audio source(s) from which the first audio data emanated. The source location module 308 may be configured to determine (e.g., estimate) location data associated with each of the audio source(s) based on the output of the sub-band analysis module(s) 304. The location data associated with a particular audio source may comprise an estimated location associated with that audio source.

Determining the location data associated with a particular audio source may comprise determining (e.g., estimating) a direction of arrival associated with that audio source. The direction of arrival associated with an audio source may comprise a direction associated with the first audio data arriving at the audio input(s) 108 from the audio source. Determining the direction of arrival associated with an audio source may comprise determining a phase difference between the first audio data arriving at two or more audio inputs 108. The phase difference, on a frequency bin by frequency bin basis, may be utilized to determine the direction of arrival of different audio sources. Determining the direction of arrival associated with an audio source utilizing the phase difference is discussed more below with regard to FIG. 4. The location data (e.g., data indicating the estimated source locations) may be stored, such as in a database 309 of the source location module 308. The source location module 308 may be configured to send the location data to the source separation module 310.

Figure 4:
FIG. 4 shows an example source location diagram.
Figure 4:
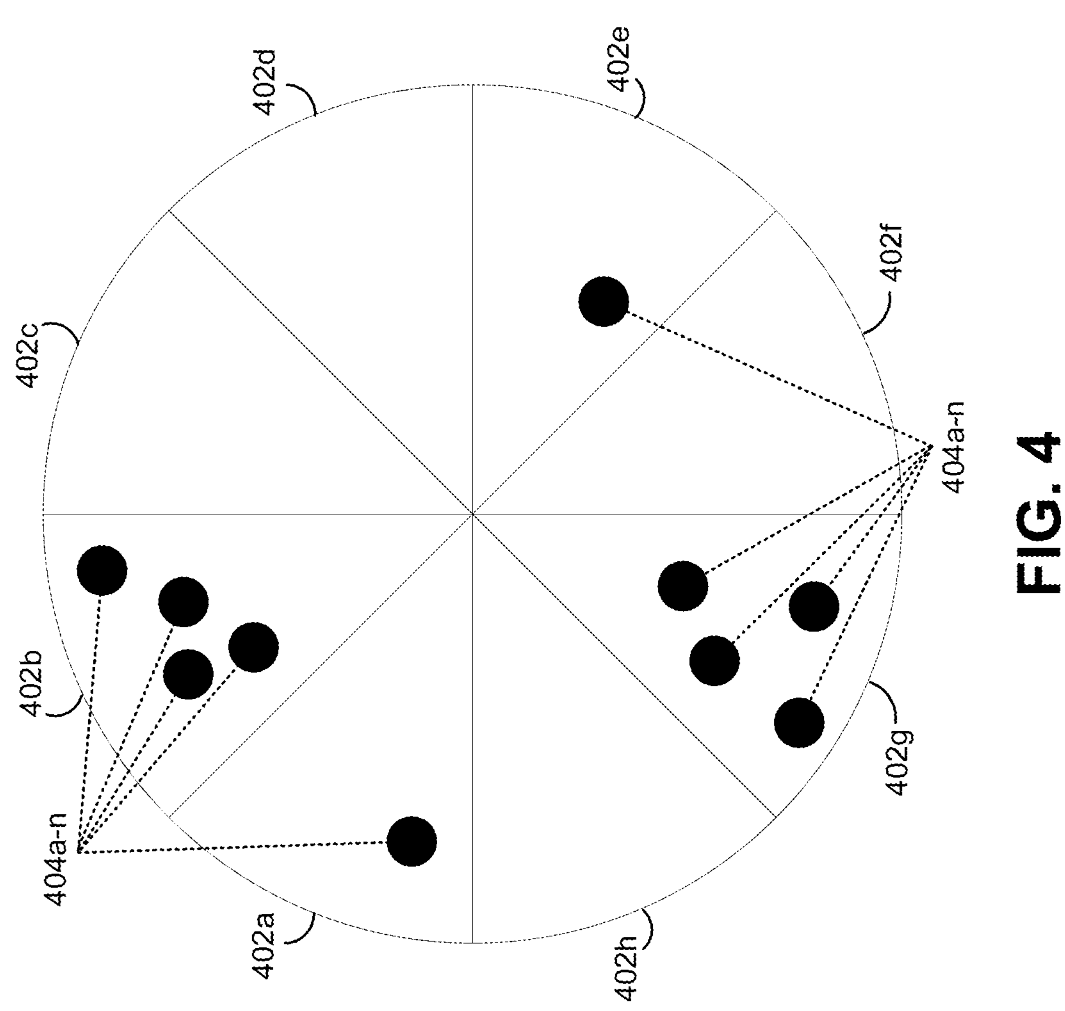

FIG. 4 shows an example source location diagram 400. An area (e.g., space) around audio input(s), such as the audio input(s) 108, may be depicted as a circle. The area around the audio input(s) may be divided into a plurality of sectors 402*a-h*. For example, the area around the audio input(s) may be divided into eight sectors, or any other number of sectors. Each sector 402*a-h* may correspond to a particular direction of arrival at the audio input(s). The buffer(s) of first audio data may be divided into a plurality of frequency bins. For example, one or more sub-band analysis modules (e.g., the sub-band analysis modules(s) 304) may divide the buffer(s) of first audio data into the plurality of frequency bins. The location of each of the plurality of frequency bins may be assigned to or matched to one of the sectors 402*a-h*. As shown in FIG. 4, the location of each of the plurality of frequency bins is represented by a dot 404*a-n*.

The most likely source sector(s) may be determined based on the quantity of dots 404*a-n* in each sector 402*a-h*. The sector(s) 402*a-h* associated with the greatest quantity of dots 404*a-n* (or almost the greatest quantity of dots 404*a-n*) may be the most likely source sector(s). If more than one sector 402*a-h* is associated with the greatest quantity of dots 404*a-n* (or almost the greatest quantity of dots 404*a-n*), this may indicate that there is a plurality of most likely source sectors. In the example of FIG. 4, the sectors 402*b* and 402*g* are both associated with the greatest quantity of dots 404*a-n* as compared to the remainder of the sectors. Thus, the sectors 402*b* and 402*g* are both the most likely source sectors.

The most likely source sector(s) may be determined based on amplitudes associated with the dots 404*a-n* in each sector 402*a-h*. Determining the most likely source sector(s) may comprise excluding frequency bins that have little to no energy in a frequency bin feed. Determining the most likely source sector(s) may comprise weighting frequency bins. For example, frequency bins that have little to no energy in a frequency bin feed (e.g., low-level frequency bin(s)) may be assigned a lesser weight than frequency bins that have higher energy in a frequency bin feed (e.g., high-level frequency bin(s)).

The quantity of most likely source sectors corresponds to the quantity of audio source(s). If there are two most likely source sectors, this may indicate that there are two distinct audio sources. As described above, each of the most likely source sectors corresponds to a direction of arrival associated with first audio data arriving at the audio input(s). Thus, each of the most likely source sectors indicates an estimated location of a particular audio source.

Referring back to FIG. 3, the source separation module 310 may be configured to receive the location data (e.g., data indicating the estimated source locations). The source separation module 310 may utilize the location data to separate the first audio data into different portions (e.g., streams) based on source. If the location data indicates that there are two likely sources, the source separation module 310 may utilize the location data to separate the first audio data into two or more different portions: one portion corresponding to the first source and a second portion corresponding to at least one second source. If the sources are uncorrelated, one source may comprise one set of frequency bins and the second source may contain a different set of frequency bins. The first audio data may be separated into the different portions based on the frequency bins. For a particular source, all of the frequency bins associated with the most likely source sector may be assembled (e.g., joined, selected). The assembled frequency bins may collectively represent the portion of the first audio data corresponding to that source.

Referring to the example of FIG. 4, all of the frequency bins (e.g., the four dots) in the sector 402*b* may be associated with a first source. These four frequency bins may be assembled to generate a portion of the first audio data corresponding to the first source. Likewise, all of the frequency bins (e.g., the four dots) in the sector 402*g* may be associated with a second source. These four frequency bins may be assembled to generate a portion of the first audio data corresponding to the second source.

If there are frequency bins that do not fall into one of the identified most likely source sectors (e.g., the dots in sectors 402*a* and 402*e*), these frequency bins may be included in both portions of first audio data. Additionally, or alternatively, the frequency bins that do not fall into one of the identified most likely source sectors may be included in neither portion of first audio data. Additionally, or alternatively, the frequency bins that do not fall into one of the identified most likely source sectors may be weighted based upon their distance from each most likely source sector. The source-separated portions of the first audio data may be de-reverberated again. For example, a source separation module, such as the source separation module 310, may be configured to send the source-separated portions of the first audio data back to a de-reverberation module, such as the de-reverberation module 306.

The de-reverberation module 306 may be configured to receive the source-separated portions of the first audio data. The second iteration of the iterative process may begin based on the de-reverberation module 306 receiving the source-separated portions of the first audio data. On the second iteration of the iterative process, the de-reverberation module 306 may determine reverberation data (e.g., reverberation characteristics) associated with each source. For each source-separated portion of the first audio data, the de-reverberation module 306 may determine reverberation data. The de-reverberation module 306 may determine the reverberation data associated with a particular source using the separated portion of the first audio data corresponding to that source. The reverberation data associated with a particular source may indicate the reverberation characteristics (e.g., the particular reverberation model) associated with that source. The reverberation data associated with each source may be stored, such as in a database 307 of the de-reverberation module 306.

The reverberation data may be determined using a least mean squares adaptive filter (e.g., algorithm). By using a least mean squares adaptive filter, the iterative process described herein may be able to be performed on small amounts (e.g., portions, durations) of audio data, such as on frames of audio data comprising less than one second of audio data. Being able to perform the iterative process described herein on smaller frames of audio data allows for the processing of audio data in real-time or near real-time. By contrast, other techniques (e.g., matrix inversion) for determining reverberation data require larger frames of audio data, such as frames of audio data comprising more than one second of audio data. Thus, such other techniques for determining reverberation data may not allow for the processing of audio data in real-time or near real-time.

The de-reverberation module 306 may be configured to de-reverberate one or more of the portions of the first audio data. The de-reverberation module 306 may be configured to de-reverberate a particular source-separated portion of the first audio data based on the reverberation data associated with that source. De-reverberating a portion of the first audio data may comprise removing at least a portion of reverberation from the portion of the first audio data. The de-reverberation module 306 may be configured to send the de-reverberated source-separated portion(s) of the first audio data to the source location module 308.

The source location module 308 may be configured to receive the de-reverberated source-separated portion(s) of the first audio data. The source location module 308 may be configured to determine (e.g., estimate) updated location data associated with each of the audio source(s). The updated location data may be improved (e.g., more accurate) relative to the location data determined in the first iteration. For example, the updated location data may be improved based on the at least a portion of reverberation being removed from the source-separated portion(s) of the first audio data. The updated location data may be determined in the same or a similar manner to how the location data was determined in the first iteration. The updated location data (e.g., data indicating the updated estimated source locations) may be stored, such as in the database 309 of the source location module 308. The source location module 308 may be configured to send the updated location data to the source separation module 310.

The source separation module 310 may be configured to receive the updated location data (e.g., data indicating the updated estimated source locations). The source separation module 310 may utilize the updated location data to update the source-separated portions of the first audio data. The updated location data associated with a particular source may indicate that different (additional or fewer) frequency bins are associated with the most likely source sector. For each source, the frequency bins associated with the most likely source sector, as indicated by the updated location data, may be assembled. The assembled frequency bins associated with a particular source may collectively represent the updated portion of the first audio data corresponding to that source. The updated source-separated portions of the first audio data may be improved (e.g., more accurate) relative to the source-separated portions of the first audio data determined in the first iteration.

The second iteration may be the final iteration of the iterative process. Alternatively, any additional quantity of iterations may be performed following the second iteration. With each additional iteration, the location data (e.g., the source location estimates) and the reverberation data may be incrementally improved.

A third iteration may be performed. If a third iteration is performed, the updated portion(s) of the first audio data may be sent back to the de-reverberation module 306. The de-reverberation module 306 may receive the updated source-separated portions of the first audio data. On the third iteration of the iterative process, the de-reverberation module 306 may determine updated reverberation data associated with each source. For each updated source-separated portion of the first audio data, the de-reverberation module 306 may determine updated reverberation data. The de-reverberation module 306 may determine the updated reverberation data associated with a particular source using the updated separated portion of the first audio data corresponding to that source. The updated reverberation data be determined using a least mean squares adaptive filter. The updated reverberation data associated with a particular source may indicate updated reverberation characteristics (e.g., the updated reverberation model) associated with that source. The updated reverberation data may be improved (e.g., more accurate) relative to the reverberation data determined in the second iteration. The updated reverberation data associated with each source may be stored, such as in the database 307 of the de-reverberation module 306.

The de-reverberation module 306 may be configured to de-reverberate the updated source-separated portions of the first audio data. The de-reverberation module 306 may be configured to de-reverberate a particular updated source-separated portion of the first audio data based on the updated reverberation data associated with that source. De-reverberating the updated source-separated portions of the first audio data may comprise removing at least a portion of reverberation from the updated portion of the first audio data. The de-reverberation module 306 may be configured to send the further de-reverberated updated source-separated portion(s) of the first audio data to the source location module 308.

The source location module 308 may be configured to receive the further de-reverberated updated source-separated portion(s) of the first audio data. The source location module 308 may be configured to determine (e.g., estimate) further updated location data associated with each of the audio source(s). The further updated location data may be improved (e.g., more accurate) relative to the updated location data determined in the second iteration. For example, the further updated location data may be improved based on the at least a portion of reverberation being removed from the updated source-separated portion(s) of the first audio data. The further updated location data may be determined in the same or a similar manner to how the location data was determined in the first iteration and the updated location data was determined in the second iteration. The further updated location data (e.g., data indicating the further updated estimated source locations) may be stored, such as in the database 309 of the source location module 308. The source location module 308 may be configured to send the further updated location data to the source separation module 310.

The source separation module 310 may be configured to receive the further updated location data (e.g., data indicating the updated estimated source locations). The source separation module 310 may utilize the further updated location data to further update the source-separated portions of the first audio data. The further updated location data associated with a particular source may indicate that different (additional or fewer) frequency bins are associated with the most likely source sector. For each source, the frequency bins associated with the most likely source sector, as indicated by the further updated location data, may be assembled. The assembled frequency bins associated with a particular source may collectively represent the further updated portion of the first audio data corresponding to that source. The further updated source-separated portions of the first audio data may be improved (e.g., more accurate) relative to the updated source-separated portions of the first audio data determined in the second iteration. The third iteration may be the final iteration of the iterative process. Alternatively, any additional quantity of iterations may be performed following the third iteration.

If the final iteration has been completed, one or more first audio signals may be generated. One or more first audio signals, each associated with a particular audio source, may be generated. Generating the audio signal(s) may comprise performing sub-band synthesis on the output of the source separation module 310. The output of the source separation module 310 may be sent to one or more sub-band synthesis modules 312. If only two iterations are performed, the source separation module 310 may be configured to send the updated source-separated portions of the first audio data generated in the second iteration to the sub-band synthesis module(s) 312. If three iterations are performed, the source separation module 310) may not send the updated source-separated portions of the first audio data generated in the second iteration to the sub-band synthesis module(s) 312. Instead, the source separation module 310 may be configured to send the further updated source-separated portions of the first audio data generated in the third iteration to the sub-band synthesis module(s) 312.

The sub-band synthesis module(s) 312 may be configured to receive the output of the source separation module 310) (e.g., the updated source-separated portions of the first audio data or the further updated source-separated portions of the first audio data). The sub-band synthesis module(s) 312 may be configured to convert the output of the source separation module 310 from the frequency domain back to the time domain by performing a sub-band synthesis. As an alternative to performing a sub-band synthesis on the output of the source separation module 310, an inverse Fourier transform may instead be performed on the output of the source separation module 310 to convert the output of the source separation module 310 from the frequency domain back to the time domain. The output of the sub-band synthesis module(s) 312 may be forwarded to one or more buffer modules 312. Generating the first audio signal(s) may comprise buffering the output of the sub-band synthesis module(s) 312. The buffer module(s) 312 may receive the output of the sub-band synthesis module(s) 312 and buffer the output of the sub-band synthesis module(s) 312 to generate the first audio signal(s).

The first audio signal(s) may then be forwarded to one or more processor(s) that are configured to determine a voice command or a voice query indicated by the audio signal. The first audio signal(s) may be forwarded to one or more processors (e.g., processor(s) 204) configured to perform keyword detection. The processor(s) may analyze the first audio signal(s) to determine if the audio signal(s) include a keyword (e.g., trigger word, key phrase, wake word). The keyword may be one or more words that indicate that a voice query or command is also included in the first audio signal(s). The keyword may be a phrase such as "Hey Device"

If the processor(s) detect the keyword in the first audio signal(s), the processor(s) may send or stream that audio signal to a server (e.g., the server 102). The server may comprise one or more processors (e.g., processor(s) 206) configured to perform ASR and one or more processors (e.g., processor(s) 208) configured to perform NLP. The first audio signal received at the server may be sent to the ASR processor(s). The ASR processor(s) may perform ASR on the first audio signal. The ASR processor(s) may transcribe the first audio signal into words. The transcription may be sent to the NLP processor(s). The NLP processor(s) may utilize the transcription to determine the voice query or command. The NLP processor(s) may send the determined voice query or command back to the voice recognition device (e.g., the computing device 106).

The voice recognition device may, in response to receiving the determined voice query or command, cause one or more actions to be performed. The actions may be caused to be performed based on the determined voice query or command. Causing the action(s) to be performed may comprise performing the action(s). Additionally, or alternatively, causing the action(s) to be performed may comprise causing a different device (e.g., one or more of the user devices 117) to perform the action(s). For example, if the determined voice query or command is "tune to channel 4," the voice recognition device may cause a television to be tuned to channel 4.

The first audio signal(s) may be forwarded to a user device 117. The user device 117 may be a full-duplex device configured to facilitate full-duplex communication between the user device 117 and another computing device. Audio associated with the first audio signal(s) may be output by the user device 117. The audio associated with the first audio signal(s) may be easier to understand or comprehend than the audio captured by the audio input(s) 108. Improving the intelligibility of the audio associated with the conversation may improve the quality of the conversation. The audio input(s) 108 may be configured to capture (e.g., receive) additional audio. The audio input(s) 108 may be configured to capture second audio. The second audio may be different than the first audio. The second audio may emanate from the audio source(s) 110. Second audio data associated with the captured second audio may be forwarded to the buffer module(s) 302. Each of the audio input(s) 108 may be configured to forward second audio data associated with the second audio captured by that particular audio input 108 to the buffer module(s) 302.

The buffer module(s) 302 may be configured to receive the second audio data. The buffer module(s) 302 may buffer the second audio data to generate one or more buffers of second audio data. The buffer(s) of second audio data may comprise the predetermined amount (e.g., portion, duration) of audio data. The predetermined amount of first audio data may comprise any amount of time. The predetermined amount of first audio data may comprise less than one second of audio (e.g., ten milliseconds, fifteen milliseconds, thirty milliseconds, thirty-two milliseconds, etc.) of audio data. The buffer(s) of second audio data may be forwarded to the sub-band analysis module(s) 304. The buffer module(s) 302 may be configured to forward the buffer(s) of second audio data to the sub-band analysis module(s) 304.

The sub-band analysis module(s) 304 may be configured to receive the buffer(s) of second audio data. The sub-band analysis module(s) 304 may be configured to convert the buffer(s) of second audio data from the time domain to the frequency domain. The sub-band analysis module(s) 304 may perform a sub-band analysis on the buffer(s) of second audio data or an inverse Fourier transform on the buffer(s) of second audio data to convert the buffer(s) of second audio data from the time domain to the frequency domain. Performing the sub-band analysis on the buffer(s) of second audio data may comprise decomposing or dividing the buffer(s) of second audio data into a plurality of frequency bins (e.g., real and imaginary, or magnitude and phase). The output of the sub-band analysis module(s) 304 may be forwarded to the de-reverberation module 306. The sub-band analysis module(s) 304 may be configured to send the output of the sub-band analysis module(s) 304 to the de-reverberation module 306.

The de-reverberation module 306 may be configured to receive the output of the sub-band analysis module(s) 304. The iterative process to improve the speech recognition of the second audio data may be initiated (e.g., started) based on the de-reverberation module 306 receiving the output of the sub-band analysis module(s) 304. As described above with regard to the first audio data, on the first iteration of the iterative process to improve the speech recognition of the second audio data, the de-reverberation module 306 may not perform any de-reverberation of the second audio data. Instead, on the first iteration of the iterative process, the de-reverberation module 306 may forward the output of the sub-band analysis module(s) 304 to the source location module 308.

The source location module 308 may receive the output of the sub-band analysis module(s) 304. As described above, location data, updated location data, and/or updated location data may already be stored, such as in the database 309. The location data, updated location data, and/or updated location data may have been stored in the database 309 during performance of the iterative process to improve the speech recognition of the first audio data. The source location module 308 may utilize this already-stored location data, updated location data, and/or updated location data (collectively, "existing location data"). In addition to utilizing the existing location data, the source location module 308 may determine new location data. The source location module 308 may send the location data (existing and/or new) to the source separation module 310.

The source separation module 310 may be configured to receive the location data. The source separation module 310 may utilize the location data to separate the second audio data into different portions (e.g., streams) based on source. The second audio data may be separated into the different portions based on frequency bins. For a particular source, all of the frequency bins associated with the most likely source sector (as indicated by the existing location data) may be assembled. The assembled frequency bins may collectively represent the portion of the second audio data corresponding to that source. The source separation module 310 may be configured to send the source-separated portions of the second audio data to the de-reverberation module 306.

The de-reverberation module 306 may be configured to receive the source-separated portions of the second audio data. The second iteration of the iterative process may begin based on the de-reverberation module 306 receiving the source-separated portions of the second audio data. On the second iteration of the iterative process, the de-reverberation module 306 may determine reverberation data associated with each source. For each source-separated portion of the second audio data, the de-reverberation module 306 may determine reverberation data.

The de-reverberation module 306 may determine the reverberation data associated with a particular source using the separated portion of the second audio data corresponding to that source. The reverberation data associated with a particular source may indicate the reverberation characteristics (e.g., the particular reverberation model) associated with that source. As described above, reverberation data and/or updated reverberation data may already be stored, such as in the database 307. The reverberation data and/or updated reverberation data may have been stored in the database 307 during performance of the iterative process to improve the speech recognition of the first audio data. The de-reverberation module 306 may utilize this already-stored reverberation data and/or updated reverberation data (collectively, "existing reverberation data"). In addition to or as an alternative to using the existing reverberation data, the de-reverberation module 306 may determine new reverberation data. The new reverberation data associated with each source may be stored, such as in the database 307 of the de-reverberation module 306. As described above, the new reverberation data may be determined using a least mean squares adaptive filter.

The de-reverberation module 306 may be configured to de-reverberate one or more of the portions of the second audio data. The de-reverberation module 306 may be configured to de-reverberate a particular source-separated portion of the second audio data based on the reverberation data (existing and/or new reverberation data) associated with that source. De-reverberating a portion of the second audio data may comprise removing at least a portion of reverberation from the portion of the second audio data. The de-reverberation module 306 may be configured to send the de-reverberated source-separated portion(s) of the second audio data to the source location module 308.

The source location module 308 may be configured to receive the de-reverberated source-separated portion(s) of the second audio data. The source location module 308 may be configured to determine (e.g., estimate) updated location data associated with each of the audio source(s). The updated location data may be improved (e.g., more accurate) relative to the location data (existing and/or new) utilized in the first iteration. The updated location data may be improved based on the at least a portion of reverberation being removed from the source-separated portion(s) of the second audio data. The updated location data (e.g., data indicating the updated estimated source locations) may be stored, such as in the database 309 of the source location module 308. The source location module 308 may be configured to send the updated location data to the source separation module 310.

The source separation module 310 may be configured to receive the updated location data (e.g., data indicating the updated estimated source locations). The source separation module 310 may utilize the updated location data to update the source-separated portions of the second audio data. The updated location data associated with a particular source may indicate that different (additional or fewer) frequency bins are associated with the most likely source sector. For each source, the frequency bins associated with the most likely source sector, as indicated by the updated location data, may be assembled. The assembled frequency bins associated with a particular source may collectively represent the updated portion of the second audio data corresponding to that source. The updated source-separated portions of the second audio data may be improved (e.g., more accurate) relative to the source-separated portions of the second audio data determined in the first iteration.

The second iteration may be the final iteration of the iterative process. Alternatively, any additional quantity of iterations may be performed following the second iteration. With each additional iteration, the location data (e.g., the source location estimates) and the reverberation data may be incrementally improved.

If the final iteration has been completed, one or more second audio signals may be generated. One or more second audio signals, each associated with a particular audio source, may be generated. Generating the second audio signal(s) may comprise performing sub-band synthesis on the output of the source separation module 310 and buffering the output of the sub-band synthesis module(s) 312. The second audio signal(s) may then be forwarded to one or more processor(s) that are configured to determine a voice command or a voice query indicated by the second audio signal. One or more actions may be caused to be performed based on the determined voice query or command. Additionally, or alternatively, the second audio signal(s) may be forwarded to a full-duplex device for use in a full-duplex communication.

Figure 5:
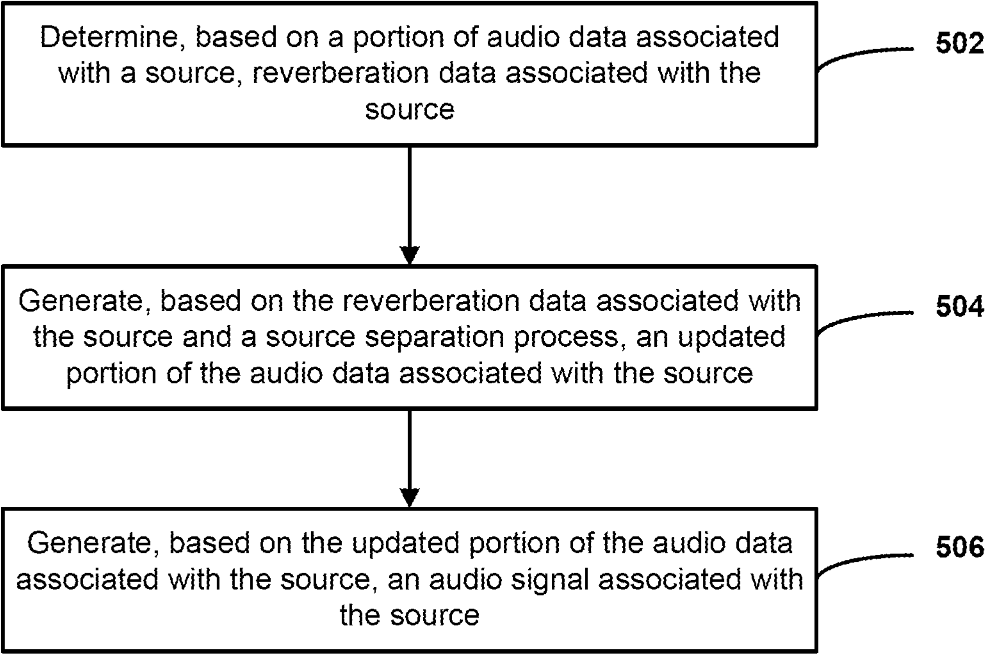
FIG. 5 shows a flowchart of an example method.

FIG. 5 is a flow diagram of an example method. The method 500 may comprise a computer implemented method for enhancing the intelligibility of audio data. A system and/or computing environment, such as the system 100 of FIG. 1 and/or the computing environment of FIG. 10, may be configured to perform the method 500. For example, the computing device 106 of FIG. 1 may be configured to perform the method 500.

A portion of audio data (e.g., an initial portion of audio data) associated with a source may be determined. The portion of audio data associated with the source may be determined based on a source separation process (e.g., blind source separation process). The source separation process may utilize location data associated with the source to separate the audio based on source. The location data may indicate an estimated location of the source. The estimated location of the source may comprise a set (e.g., a plurality) of frequency bins associated with the audio data. The set of frequency bins may be assembled (e.g., joined, selected). The assembled frequency bins may collectively represent the portion of the audio data associated with the source.

At 502, reverberation data associated with the source may be determined. The reverberation data may be determined based on the portion of the audio data associated with the source. The reverberation data associated with the source may indicate the reverberation characteristics (e.g., the particular reverberation model) associated with the source. The reverberation data be determined using a least mean squares adaptive filter.

At 504, an updated portion of the audio data associated with the source may be generated. The updated portion of the audio data associated with the source may be generated based on the reverberation data associated with the source and the source separation process. The portion of audio data associated with the source may be de-reverberated using the reverberation data. De-reverberating the portion of audio data associated with the source may comprise removing at least a portion of reverberation from the portion of the audio data. The de-reverberated portion of the audio data may be used to determine updated location data (e.g., an updated estimated location) associated with the source. The updated location data may be improved (e.g., more accurate) relative to the initial location data utilized to determine the portion of audio data associated with the source. The updated location data may be improved based on the at least a portion of reverberation being removed from the portion(s) of the audio data.

The updated location data may be utilized to generate the updated portion of the audio data associated with the source. The updated location data associated with the source may indicate that different (additional or fewer) frequency bins are associated with the source. The frequency bins indicated by the updated estimated location may be assembled. The assembled frequency bins may collectively represent the updated portion of the audio data associated with the source. The updated portion of the audio data associated with the source may be improved (e.g., more accurate) relative to the initial portion of the audio data associated with the source.

At 506, an audio signal associated with the source may be generated. The audio signal associated with the source may be generated based on the updated portion of the audio data associated with the source. Generating the audio signal associated with the source may comprise performing sub-band synthesis on the updated portion of the audio data associated with the source. Performing sub-band synthesis on the updated portion of the audio data associated with the source may converting the updated portion of the audio data associated with the source from the frequency domain to the time domain. As an alternative to or in addition to performing a sub-band synthesis, an inverse Fourier transform may instead be performed on the updated portion of the audio data associated with the source to convert the updated portion of the audio data associated with the source from the frequency domain to the time domain. Generating the audio signal associated with the source may comprise buffering the audio signal associated with the source in the time domain.

A microphone array may capture audio data. The audio data may include speech emanating from a human (e.g., first source) and background noise emanating from a device (e.g., a second source, such as a television, etc.) The audio data may be separated into two portions: a first portion associated with the human and a second portion associated with the device. The audio data may be separated into the two portions based on location data indicating the location of the human and/or the location of the device. Reverberation data associated with the human may be determined based on the first portion of audio data associated with the human. The reverberation data may be utilized to remove at least a portion of reverberation from the first portion of audio data associated with the human. The first portion of audio data associated with the human may be updated based on removing the portion of reverberation from the first portion of audio data associated with the human. An audio signal may be generated based on the updated first portion of audio data associated with the human. The audio signal may be processed to determine a voice command or query included in the speech.

Figure 6:
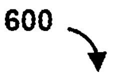
FIG. 6 shows a flowchart of an example method.
Figure 6:
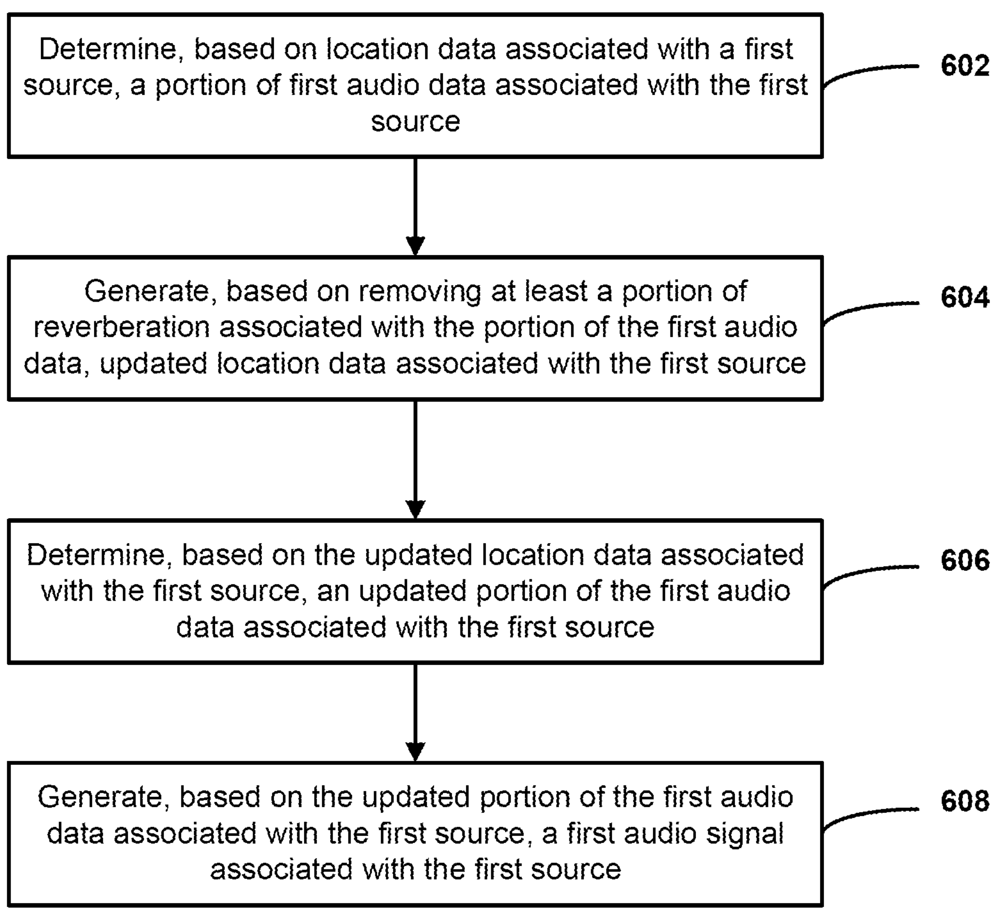

FIG. 6 is a flow diagram of an example method. The method 600 may comprise a computer implemented method for enhancing the intelligibility of audio data. A system and/or computing environment, such as the system 100 of FIG. 1 and/or the computing environment of FIG. 10, may be configured to perform the method 600. For example, the computing device 106 of FIG. 1 may be configured to perform the method 600.

At 602, a portion of first audio data (e.g., an initial portion of audio data) associated with the first source may be determined. The portion of first audio data associated with the first source may be determined based on location data associated with a first source. The portion of audio data associated with the first source may be determined based on a source separation process (e.g., blind source separation process). The source separation process may utilize location data associated with the first source to separate the audio based on source. The location data may indicate an estimated location of the first source. The estimated location of the first source may comprise a set (e.g., a plurality) of frequency bins associated with the audio data. The set of frequency bins may be assembled (e.g., joined, selected). The assembled frequency bins may collectively represent the portion of the audio data associated with the first source.

At 604, updated location data associated with the first source may be generated. The updated location data associated with the first source may be generated based on removing at least a portion of reverberation associated with the portion of the first audio data. Reverberation data associated with the first source may be determined. The reverberation data may be determined based on the portion of the audio data associated with the first source. The reverberation data associated with the first source may indicate the reverberation characteristics (e.g., the particular reverberation model) associated with the first source. The reverberation data be determined using a least mean squares adaptive filter. The portion of audio data associated with the first source may be de-reverberated using the reverberation data. De-reverberating the portion of audio data associated with the source may comprise removing at least a portion of reverberation from the portion of the audio data. The de-reverberated portion of the audio data may be used to determine updated location data (e.g., an updated estimated location) associated with the first source. The updated location data may be improved (e.g., more accurate) relative to the initial location data utilized at 602. The updated location data may be improved based on the at least a portion of reverberation being removed from the portion(s) of the audio data.

At 606, an updated portion of the first audio data associated with the first source may be determined. The updated portion of the first audio data associated with the first source may be determined based on the updated location data associated with the first source. The updated location data associated with the first source may indicate that different (additional or fewer) frequency bins are associated with the first source. The frequency bins indicated by the updated estimated location may be assembled. The assembled frequency bins may collectively represent the updated portion of the audio data associated with the first source. The updated portion of the audio data associated with the first source may be improved (e.g., more accurate) relative to the initial portion of the audio data associated with the first source.

At 608, a first audio signal associated with the first source may be generated. The first audio signal associated with the first source may be generated based on the updated portion of the first audio data associated with the first source. Generating the audio signal associated with the first source may comprise performing sub-band synthesis on the updated portion of the audio data associated with the first source. Performing sub-band synthesis on the updated portion of the audio data associated with the first source may converting the updated portion of the audio data associated with the first source from the frequency domain to the time domain. As an alternative to performing a sub-band synthesis, an inverse Fourier transform may instead be performed on the updated portion of the audio data associated with the first source to convert the updated portion of the audio data associated with the first source from the frequency domain to the time domain. Generating the audio signal associated with the first source may comprise buffering the audio signal associated with the first source in the time domain.

A microphone array may capture audio data. The audio data may include speech emanating from a first human (e.g., first source) and speech emanating from a second human (e.g., second source). The audio data may be separated into two portions: a first portion associated with the first human and a second portion associated with the second human. The audio data may be separated into the two portions based on location data indicating the location of the two humans. Reverberation data associated with each human may be determined based on the respective portion of audio data associated with that human. The reverberation data may be utilized to remove at least a portion of reverberation from each portion of audio data. The portions of audio data may be updated based on removing the portion of reverberation. An audio signal may be generated based on one or more of the updated portions of audio data. The audio signal(s) may be processed to determine a voice command or query included in the speech.

Figure 7:
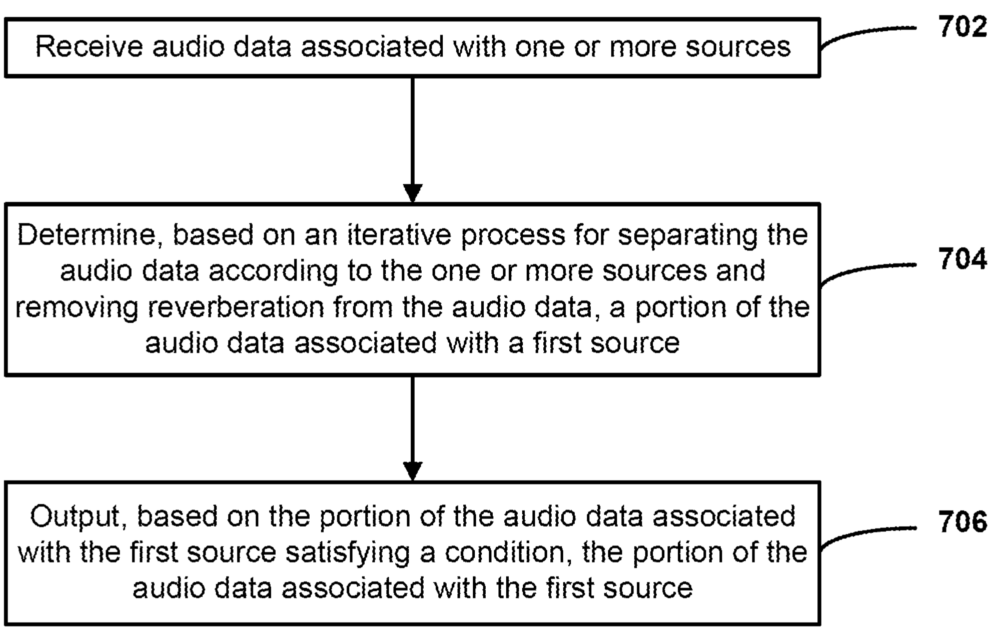
FIG. 7 shows a flowchart of an example method.

FIG. 7 is a flow diagram of an example method. The method 700 may comprise a computer implemented method for enhancing the intelligibility of audio data. A system and/or computing environment, such as the system 100 of FIG. 1 and/or the computing environment of FIG. 10, may be configured to perform the method 700. For example, the computing device 106 of FIG. 1 may be configured to perform the method 700.

At 702, audio data associated with one or more sources may be received. The audio data may be received at one or more audio inputs. The audio inputs may comprise microphone or microphone arrays. The audio input may be configured to capture audio data emanating from the one or more audio sources. The audio source(s) may comprise anything (e.g., device, object, animal, etc.) or anyone (e.g., human) that is capable of outputting audio.

At 704, a portion of the audio data associated with a first source may be determined. The portion of the audio data associated with the first source may be determined based on an iterative process for separating the audio data according to the one or more sources and removing reverberation from the audio data. The iterative process may comprise de-reverberating (e.g., removing reverberation from) the audio data and performing blind source separation (e.g., separating the audio data according to the one or more sources). During the first iteration, there may be no basis for de-reverberating the audio data as the audio data has not yet been separated based on source. A location estimate of each of the one or more sources may be determined based on the audio data. The location estimate of each of the one or more sources may be determined based on estimating a direction (e.g., angle of arrival) associated with the audio data arriving at the one or more audio inputs from each of the one or more sources. The location estimate may be utilized to separate the audio data according to the one or more sources. During the second iteration, the separated audio data may be de-reverberated. An updated (e.g., improved) location estimate may be determined based on the de-reverberated audio data. The improved location estimate may be utilized to update (e.g., improve) the separation of the audio data according to the one or more sources. Any quantity of additional iterations may be performed. The source location estimates and/or de-reverberation may incrementally improve along with each additional iteration.

At 706, the portion of the audio data associated with the first source may be output. The portion of the audio data associated with the first source may be output from the iterative process (e.g., no more iterations of the iterative process may be performed on the audio data). The portion of the audio data associated with the first source may be output based on the portion of the audio data satisfying a condition. The portion of the audio data associated with the first source may satisfy the condition if the amount of reverberation associated with the portion of the audio data is less than or equal to a threshold. An audio signal associated with the first source may be generated. The audio signal associated with the first source may be generated based on the portion of the audio data associated with the first source.

A microphone array may capture audio data. The audio data may include audio emanating from a first source and audio emanating from a second source. An iterative process for separating the audio data according to the one or more sources and removing reverberation from the audio data may be performed. The iterative process may comprise de-reverberating (e.g., removing reverberation from) the audio data and performing blind source separation (e.g., separating the audio data according to the one or more sources). The output of the iterative process may be utilized to generate an audio signal associated with the first source or the second source.

Figure 8:
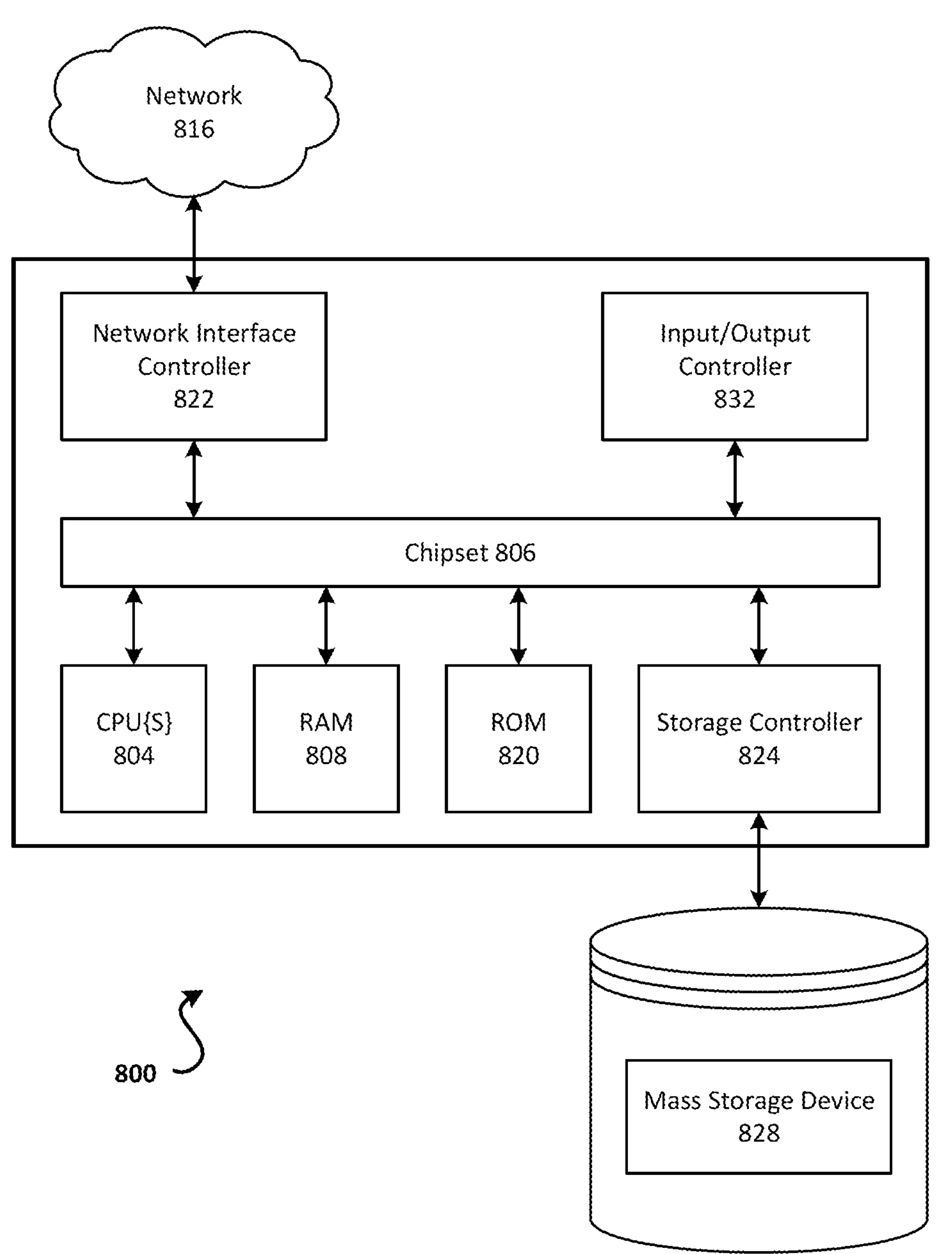
FIG. 8 is a block diagram of an example computing device.

FIG. 8 depicts a computing device that may be used in various aspects, such as the servers and/or devices depicted in FIG. 1. With regard to the example architecture of FIG. 1, the server device 102, the gateway device 104, the computing device 106, the one or more user devices 117, and/or the audio sources 110 may each be implemented in an instance of a computing device 800 of FIG. 8.

The computer architecture shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIG. 5, FIG. 6, and FIG. 7.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s) 605. The GPU(s) 605 may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random access memory (RAM) 808 used as the main memory in the computing device 800. The chipset 806 may further provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN) 816. The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 828 by detecting the physical states or characteristics of one or more particular locations within the physical storage units.

In addition to the mass storage device 828 described above, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 6, may store an operating system utilized to control the operation of the computing device 800. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described above. The computing device 800 may have access to computer-readable storage media storing computer-executable instructions, which, when executed by the computing device 800, may perform the methods described in relation to FIG. 5, FIG. 6, and FIG. 7.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a." "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, or in addition, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:

generating source-separated audio data indicative of a first portion of audio data associated with a source;

determining, based on the source-separated audio data, reverberation data associated with the source;

generating, based on the reverberation data associated with the source, updated source-separated audio data indicative of a second portion of the audio data associated with the source; and generating, based on the updated source-separated audio data, an audio signal associated with the source.

2. The method of claim 1, further comprising:

processing the audio signal to determine at least one of a voice command or a voice query; and causing at least one action to be performed based on the voice command or the voice query.

3. The method of claim 1, wherein the source-separated audio data is generated based on location data associated with the source.

4. The method of claim 1, wherein determining the reverberation data associated with the source is based on a least mean squares (LMS) adaptive filter.

5. The method of claim 1, wherein the updated portion of the source-separated audio data is associated with less reverberation than the source-separated audio data.

6. The method of claim 1, wherein the audio data is indicative of less than one second of audio.

7. A method comprising:

determining, based on a source separation process and location data associated with a first source, first source-separated audio data associated with the first source;

updating, based on removing at least a portion of reverberation associated with the first source-separated audio data, the location data associated with the first source;

determining, based on the source separation process and the updated location data associated with the first source, updated first source-separated audio data associated with the first source; and generating, based on the updated first source-separated audio data associated with the first source, a first audio signal associated with the first source.

8. The method of claim 7, further comprising:

processing the first audio signal to determine at least one of a voice command or a voice query; and causing at least one action to be performed based on the voice command or the voice query.

9. The method of claim 7, wherein the location data associated with the first source comprises an estimated direction associated with the first audio data arriving at one or more audio inputs from the first source, and wherein the generating the updated location data associated with the first source comprises determining an updated estimated direction associated with the first audio data arriving at the one or more audio inputs from the first source.

10. The method of claim 9, wherein determining the first source-separated audio data associated with the first source comprises determining that an estimated location of a frequency band associated with the first source-separated audio data corresponds to the estimated direction, and wherein determining the updated first source-separated audio data associated with the first source comprises determining that an estimated location of a frequency band associated with the updated first source-separated audio data corresponds to the updated estimated direction.

11. The method of claim 7, further comprising determining, based on a least mean squares (LMS) adaptive filter, reverberation data associated with the first source-separated audio data, wherein removing the at least the portion of reverberation associated with the first source-separated audio data is based on the reverberation data.

12. The method of claim 7, further comprising:

determining, based on the updated location data associated with the first source, a portion of second audio data associated with the first source;

generating, based on removing at least a portion of reverberation associated with second audio data, further updated location data;

determining, based on the further updated location data, an updated portion of the second audio data associated with the first source; and generating, based on the updated portion of the second audio data associated with the first source, a second audio signal associated with the first source.

13. The method of claim 7, wherein the first source-separated audio data is indicative of less than one second of audio.

14. The method of claim 7, wherein the updated first source-separated audio data associated with the first source is associated with less reverberation than the first source-separated audio data associated with the first source.

15. A method comprising:

receiving audio data associated with one or more sources;

determining, based on an iterative process for separating the audio data according to the one or more sources to generate source-separated audio data, removing reverberation from the source-separated audio data to generate de-reverberated source-separated audio data, and re-separating the de-reverberated source-separated audio data according to the one or more sources, a portion of the audio data associated with a first source selected from the one or more sources; and outputting, based on the portion of the audio data associated with the first source satisfying a condition, the portion of the audio data associated with the first source.

16. The method of claim 15, further comprising:

processing the portion of the audio data associated with the first source to determine at least one of a voice command or a voice query; and causing at least one action to be performed based on the voice command or the voice query.

17. The method of claim 15, wherein separating the audio data according to the one or more sources is based at least on removing the reverberation from the audio data.

18. The method of claim 17, wherein removing the reverberation from the audio data comprises determining reverberation data associated with the one or more sources based on a least mean squares (LMS) adaptive filter.

19. The method of claim 15, wherein the portion of the audio data associated with the first source satisfies the condition if an amount of reverberation associated with the portion of the audio data is less than or equal to a threshold.

* * * * *